(12) United States Patent
George et al.

(10) Patent No.: US 10,122,583 B2
(45) Date of Patent: Nov. 6, 2018

(54) AGGREGATED NETWORK MODEL WITH COMPONENT NETWORK AGGREGATION

(71) Applicant: ORACLE INTERNATIONAL CORPORATION, Redwood Shores, CA (US)

(72) Inventors: Betsy George, Nashua, NH (US); Cheng-Hua Wang, Bedford, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 160 days.

(21) Appl. No.: 14/325,695

(22) Filed: Jul. 8, 2014

(65) Prior Publication Data

US 2016/0013987 A1    Jan. 14, 2016

(51) Int. Cl.
*H04L 12/24* (2006.01)
*G06F 17/30* (2006.01)
*H04L 12/751* (2013.01)
*G06F 12/02* (2006.01)
*G06F 12/0817* (2016.01)
(Continued)

(52) U.S. Cl.
CPC .......... *H04L 41/12* (2013.01); *G06F 12/0292* (2013.01); *G06F 12/0826* (2013.01); *G06F 12/1009* (2013.01); *G06F 17/30156* (2013.01); *G06F 17/30318* (2013.01); *G06F 17/30321* (2013.01); *G06Q 50/06* (2013.01);
(Continued)

(58) Field of Classification Search
CPC ............ G06F 7/509; G06F 17/30321; G06F 17/30156; G06F 17/30318; G06F 12/0292; G06F 12/1009; G06F 12/0826; G01C 21/3407–21/3438; G01C 21/3423; G01C 21/3453; G06Q 50/06; G06Q 50/30; G06Q 10/047; G06Q 10/109; H04L 41/12; H04L 41/145; H04L 45/02; H04L 45/24
See application file for complete search history.

(56) References Cited

U.S. PATENT DOCUMENTS 6,192,314 B1 *  2/2001  Khavakh ................ G01C 21/34
                                                    701/410
6,246,669 B1 *  6/2001  Chevalier ............... H04L 45/02
                                                    370/238

(Continued)

FOREIGN PATENT DOCUMENTS

WO    2013014612 A1    1/2013

*Primary Examiner* — Joshua Kading
(74) *Attorney, Agent, or Firm* — Kraguljac Law Group, LLC (57) ABSTRACT

Systems, methods, and other embodiments associated with aggregated network modeling with component network aggregation are described. In one embodiment, a method for modeling an aggregated network includes storing a first set of nodes associated with a first network and a first set of links associated with the first network, wherein each link in the first set of links connects a pair of nodes in the first set of nodes. A second set of nodes associated with a second network and a second set of links associated with the second network are also stored. A set of transfer links is stored. Each transfer link connects a node in the first network to a node in the second network. Metadata defines the aggregated network as the first set of nodes, the first set of links, the second set of nodes, the second set of links, and the set of transfer links.

20 Claims, 9 Drawing Sheets

(51) Int. Cl.
    *G06F 12/1009*     (2016.01)
    *G06Q 50/06*     (2012.01)
    *G06Q 50/30*     (2012.01)
    *H04L 12/707*     (2013.01)

(52) U.S. Cl.
    CPC ............ *G06Q 50/30* (2013.01); *H04L 41/145* (2013.01); *H04L 45/02* (2013.01); *H04L 45/24* (2013.01)

(56) References Cited

U.S. PATENT DOCUMENTS

| | | | | |
|---|---|---|---|---|
| 6,965,903 | B1* | 11/2005 | Agarwal | G06F 17/30595 |
| 8,429,199 | B2 | 4/2013 | Wang et al. | |
| 2004/0186903 | A1* | 9/2004 | Lambertz | H04L 41/12 709/224 |
| 2005/0097108 | A1 | 5/2005 | Wang et al. | |
| 2007/0130133 | A1* | 6/2007 | Lee | G06F 17/30415 |
| 2009/0063516 | A1* | 3/2009 | Wang | H04L 41/0893 |
| 2011/0112759 | A1* | 5/2011 | Bast | G01C 21/3423 701/533 |
| 2011/0289071 | A1* | 11/2011 | Gangadhar | H04L 45/48 707/722 |
| 2012/0158301 | A1* | 6/2012 | Schilling | H03M 7/40 701/533 |
| 2014/0005924 | A1* | 1/2014 | Letz | G01C 21/343 701/424 |
| 2014/0012611 | A1* | 1/2014 | Francis | G01C 21/3446 705/6 |
| 2014/0257697 | A1* | 9/2014 | Gishen | G01C 21/3438 701/537 |
| 2015/0026158 | A1* | 1/2015 | Jin | G06F 17/30958 707/722 |

\* cited by examiner

■ Water Network Feature
○ Road Network Node

FIG. 8A

Component Network 1
Utility Network

Transfer Links

Component Network 2
Road Network

AGGREGATED NETWORK MODEL WITH COMPONENT NETWORK AGGREGATION

BACKGROUND

An aggregated network is made up of multiple networks (called component networks in this document) that are interconnected with one another. An example of an aggregated network is a multimodal transportation network, such as a public transportation system in a metropolitan area, which may include multiple bus and train networks managed by various agencies, with each network offering multiple transit routes. These multimodal transportation networks, more often than not, provide users the choice to transfer across modes or routes, thus creating interconnections between the networks.

Though transportation networks are commonly used as illustrative examples of multimodal or aggregated networks, aggregated networks are also extensively used to capture the structure of a wide variety of complex networks such as biological and utility networks. Aggregated networks could include multiple networks that belong to the same mode (such as multiple bus networks or multiple water supply networks) or multiple networks of dissimilar nature such as bus and train networks or a water network in conjunction with a sewage network and road network.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

A unique feature of aggregated networks is the presence of interconnections between component networks, while the component networks maintain their individual characteristics. Analysis on an aggregated network should capture the interconnections between the underlying component networks. A multimodal transportation network may consist of multiple train and bus networks and offer facilities for commuters to transfer across multiple networks. It is often necessary to conduct route planning over the entire multimodal network, including all component networks, to make the capabilities of the entire network available to the user. Existing approaches use proprietary models that are built for specific applications, thus making them less versatile across application domains. The data representations do not separate application specific details from the model, enforcing the need for customized solutions.

Systems and methods described herein use a generic network representation for both component and aggregated networks and provide a clean separation of the logical data model from the application specific details. The component networks can differ in their key characteristics. The modeling techniques described herein provide the facility to represent the specific features of component networks while providing a means to aggregate component networks by modeling the interconnections across networks. Accordingly, the aggregated network is modeled by aggregating elements of the individual component networks as well as elements that capture the interconnections between the component networks.

Figure 1:
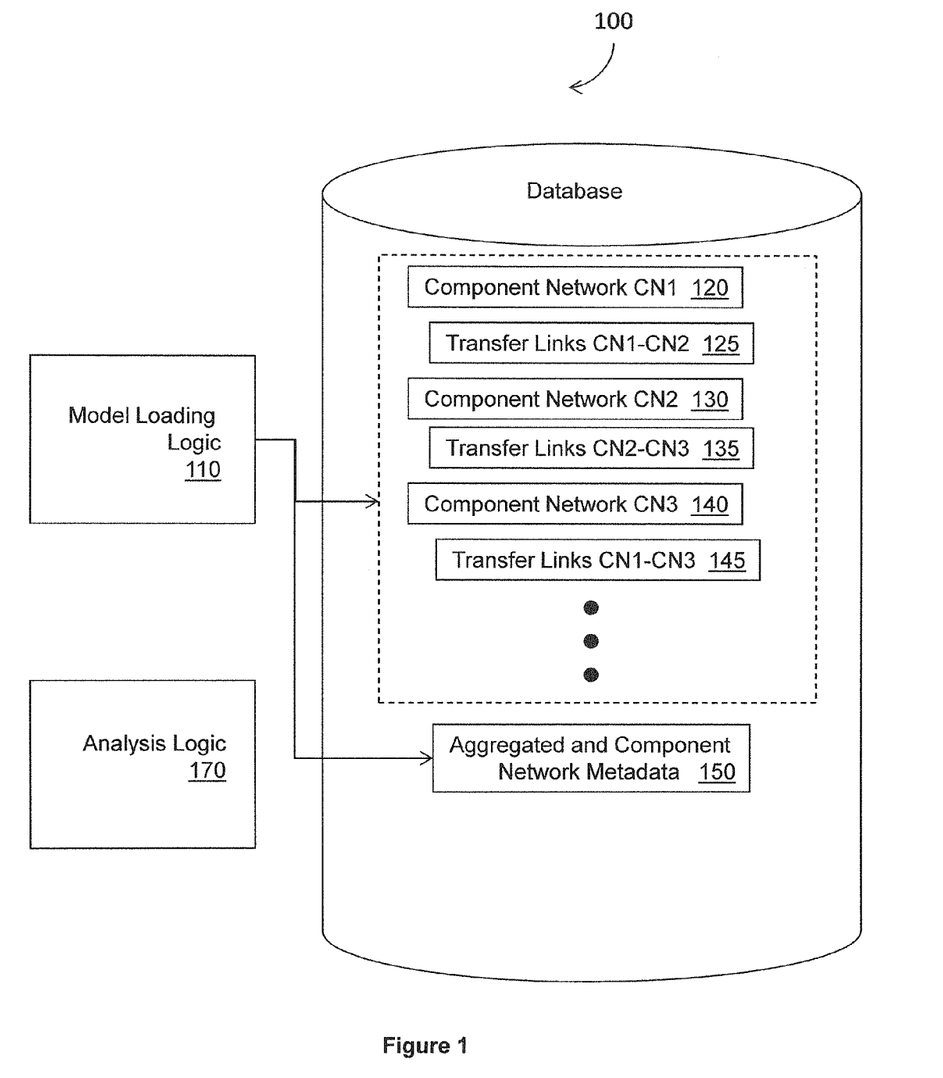
FIG. 1 illustrates one embodiment of a system associated with aggregated network modeling with component network aggregation.

With reference to FIG. 1, one embodiment of a system 100 associated with modeling aggregated networks by aggregating component networks is illustrated. The system 100 includes model loading logic 110 and analysis logic 170. The model loading logic 110 is configured to load component network models and aggregated network models into a database for use in network analysis. For simplicity, in FIG. 1 three component networks, a first component network CN1 120 (e.g., a train network), a second component network CN2 130 (e.g., a bus network), and a third component network CN3 140 (e.g., subway network) are stored in the database by the model loading logic 110. In some embodiments, many more component and aggregated networks will be stored in the database.

Figure 4:
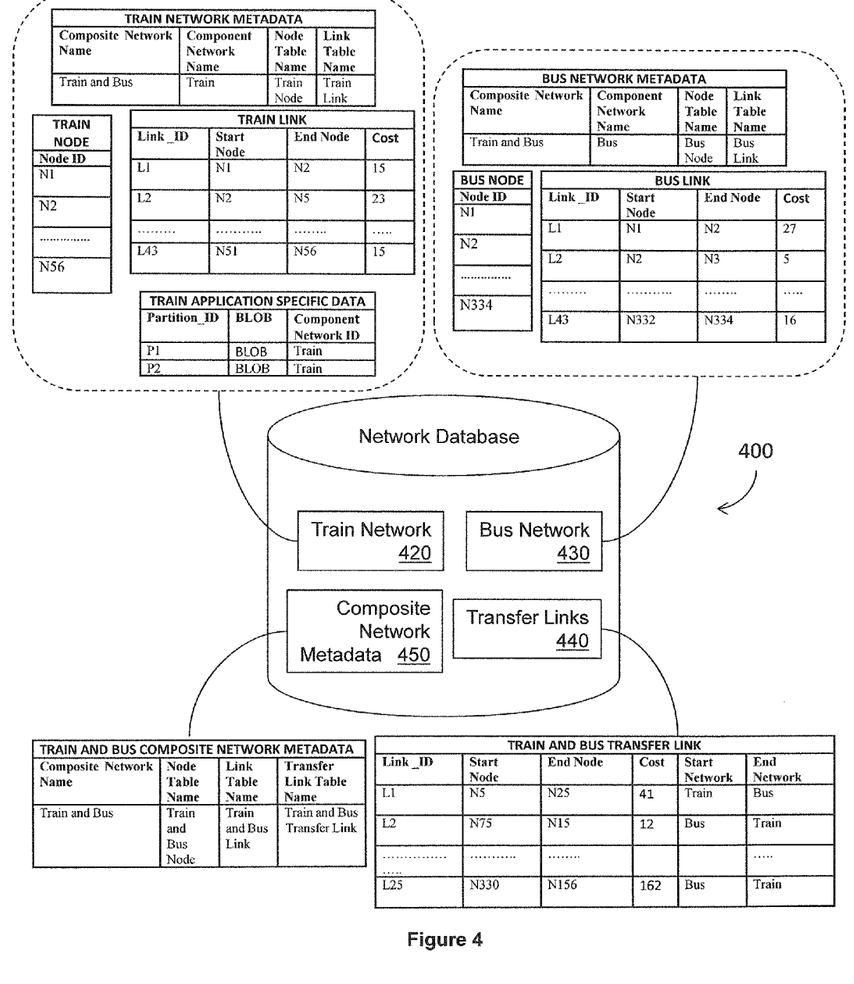
FIG. 4 illustrates an embodiment of an aggregated network model that aggregates multiple transportation networks.

As will be seen in more detail in FIG. 4, each component network is stored in the network database as a set of nodes, a set of links, and metadata that defines where the component network's nodes and links are stored. Nodes represent objects of interest such as geographic locations (e.g., bus or train stations, gas stations, homes, offices, cities) or people (e.g., in a social network). Links connect two nodes and can have an associated cost. For example, a link between two bus stations may have an associated cost corresponding to the length of time it takes to travel on the bus between stations. Each link can have several different associated costs such as a distance, travel time, and so on. In a social network context, the cost of a link may indicate the strength of a relationship between people or a level of influence one person has on another. In some embodiments, a link may include several different costs so that the appropriate notion of cost can be selected for a particular analysis.

CN1 120, CN2 130, and CN3 140 are independent and self contained. No links in CN1 120 connect to nodes in CN2 (or any other network), and so on. Network analysis can be performed on the individual component networks CN1, CN2, or CN3 alone. To model an aggregated network that includes CN1 120 and CN2 130, the model loading logic stores a set of transfer links 125 that capture information about interconnections between the CN1 and CN2. To model an aggregated network that includes CN2 130 and CN3 140, the model loading logic stores a set of transfer links 135 that capture information about interconnections between the CN2 and CN3. To model an aggregated network that includes CN1 120 and CN3 140, the model loading logic stores a set of transfer links 145 that capture information about interconnections between the CN1 and CN3. It is possible that no transfer links are present for certain combinations of component networks if no direct interconnections between the component networks are included in the model.

The interconnections across networks provide the basis of aggregation across component networks. A user being able to transfer from a bus route to a train route when stops are within walking distance is an example for such an interconnection. A water network pumping station located on a road segment provides the relationship across a road network and water network; the pumping station is accessible from the road network by being located on a road segment. Such interconnections across networks are modeled using links across networks (or specifically nodes that represent the network entities that are related to each other) called transfer links. In the transportation network, transfer links connect the nodes representing the bus and train stops and in the water network, the transfer links connect the pumping station to the road network nodes. The set of transfer links 125 between CN1 120 and CN2 130 is stored independently from the data for CN1 and CN2, and so on.

Aggregated network metadata 150 is stored for the aggregated networks. The aggregated network metadata 150 identifies where the aggregated networks' respective nodes and links (including transfer links) can be found. Using the metadata, all elements of the aggregated network can be located when analysis of the aggregated network is called for. Note that the nodes and links of the various component networks are not repeatedly stored in aggregated form, saving memory and simplifying the design.

Figure 2:
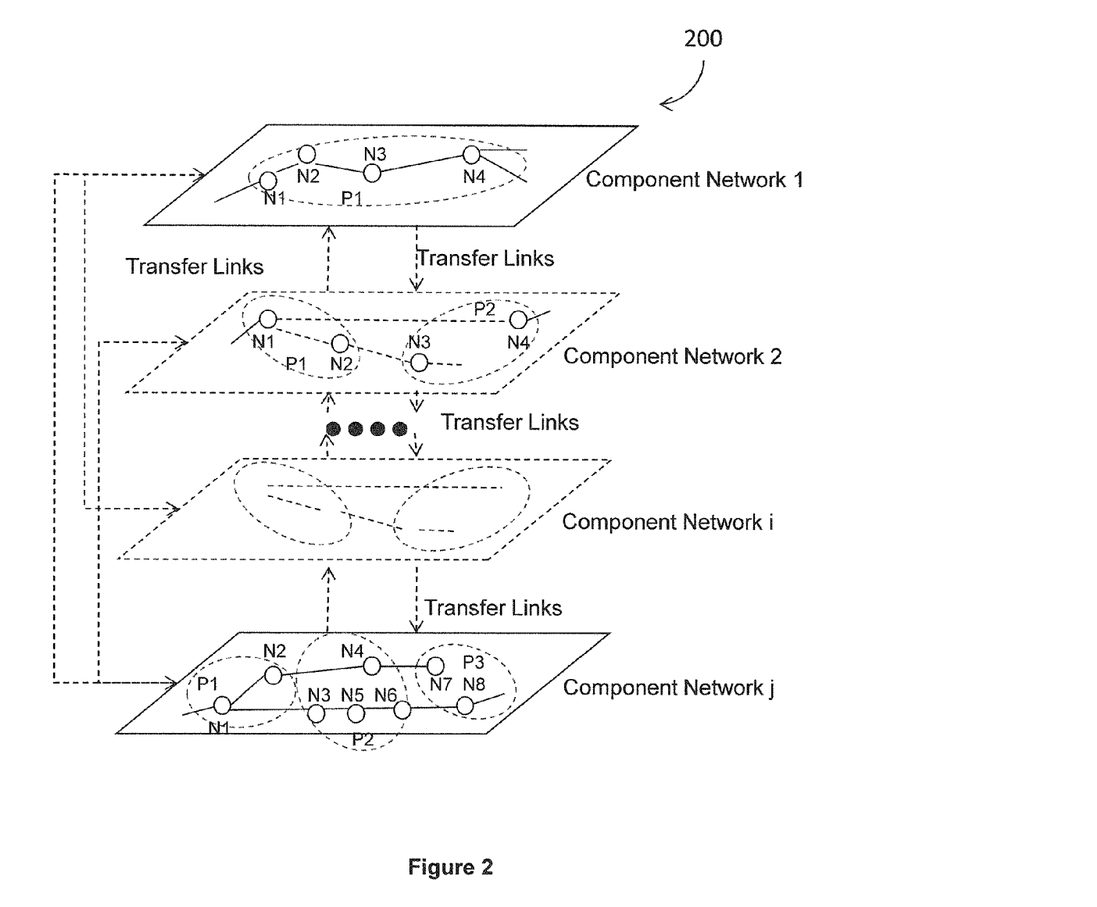
FIG. 2 illustrates an example of how transfer links can be used to create an aggregated network from multiple component networks.

FIG. 2 illustrates an example of an aggregated network 200 that includes j component networks 1-*j*. Each individual component network has a set of nodes and links that connect the nodes. For example, component network 1 includes four nodes with three links that connect the nodes and other links that extend from the nodes to other nodes in the first network that are not shown in FIG. 2. Transfer links are shown connecting nodes in component network 1 and component network 2, component network 1 and component network i, component network 2 and component network j, component network 1 and component network j, and component network 1 and component network j. In some embodiments, transfer links connecting all possible pairs of component networks may not be stored. This may be because direct transfers between two component networks may not exist or because the transfer information has not yet been collected. In the latter case, the transfer links may be added later to the set of transfer links for the aggregated network. In one embodiment, transfer links for a pair of networks can be dynamically modeled for use in aggregated network analysis.

In FIG. 2, it can be seen that nodes in each component network are grouped into partitions (e.g., P1-P3). In component network j, nodes from partitions P1-P3 are shown. Partitioning is used to facilitate load-on-demand (LOD) network analysis framework of Oracle® Network Data Model (NDM) network analysis that allows for subsets of network data to be analyzed on demand. Nodes in each component network are assigned to a partition. When network analysis calls for a given node, data for all nodes in the given node's partition is moved into working memory along with data for all links that include at least one node in the given node's partition. For an aggregated network, each partition includes nodes from a single component network and no partition includes nodes from two different component networks. While partitioning facilitates network analysis on very large networks, in some embodiments, the component networks are not partitioned in which case the component networks can be conceptualized as including a single partition.

Figure 3:
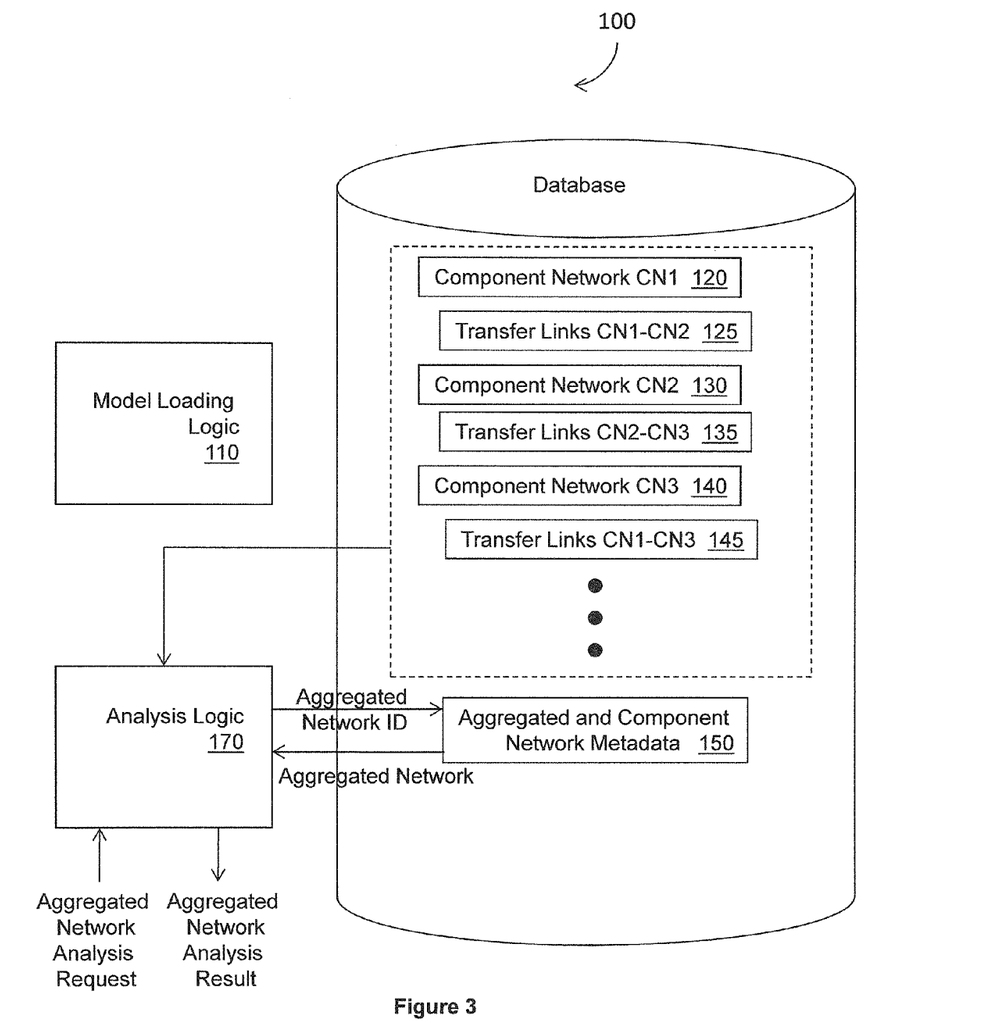
FIG. 3 illustrates one embodiment of the system of FIG. 1 performing aggregate network analysis.

FIG. 3 illustrates the system 100 of FIG. 1 processing a request for aggregated network analysis on an aggregated network specified by an aggregated network ID. For example, the aggregated network ID might identify an aggregated network that includes CN1 120 and CN2 130. The analysis logic 170 receives the request and accesses the aggregated network metadata 150. Based on the metadata stored for the aggregated network ID, the analysis logic 170 accesses an aggregate set of nodes that includes the nodes from CN1 120 and CN2 130 as well as an aggregate set of links that includes i) the links from CN1 120, ii) CN2 130, and iii) the set of transfer links 125 for the aggregated network CN1-CN2.

The component network aggregation technique allows the analysis logic 170 to perform analysis on the aggregated network as if the aggregated network were a component network. This allows existing component network level calculation and rendering algorithms to be used for aggregated networks with little or no modification.

In one embodiment, the metadata for the aggregated network that combines CN1 and CN2 includes a row (e.g., a view) that combines node tables from CN1 and CN2 and second row that combines link tables from CN1 and CN2 and the transfer link table that stores the set of transfer links between CN1 and CN2. In this manner, the nodes and links are only stored once and are aggregated with the view when aggregated network analysis is being performed. The analysis logic 170 performs the requested network analysis on the aggregate nodes, aggregate links, and transfer links and returns the result. When partitioning is used, the analysis logic 170 loads the partition(s) from the component networks and transfer links across the component networks as necessary depending on which nodes are included in a portion of the network being analyzed.

Many different types of network analysis can be performed on aggregated (or component) networks. Spatial analysis, path analysis, and cost analysis are just a few examples of the types of network analysis that can be performed by the analysis logic 170. The analysis logic 170 may include various analysis functions that perform, for example, a shortest path function, an all paths function, a connected components function, a within cost function, a nearest neighbor function, and a minimum cost spanning tree function. These functions input uniquely identified nodes and links, with associated costs, between the nodes. The functions can operate in the same manner regardless of whether all the nodes and links are from a single component network or an aggregated network that includes nodes and links from several component networks and transfer links between the component networks.

User preferences and business logic relevant to each component network are modeled through cost calculators and constraints used by the analysis logic 170. Calculators are associated with component networks and aggregated networks, such that each network can have its own set of unique cost calculators. User preferences are modeled as optimization costs in the representation. For example, in a multimodal transportation network, a commuter may prefer the least travel time route or choose to minimize the number of transfers along the route or opt for a minimum fare route. The computations for such routes can set the costs as the travel time or number of transfers or total fare, using cost calculators. Each component network can set its own optimization costs through its own set of cost calculators and perform analysis independently. For example, route computation on a bus network can be set to minimize the number of transfers across bus routes and a computation on a train network, which is a part of the same multimodal network, can be performed to find a route with the least travel time.

In addition to preferences, business logic can be incorporated into network analysis through constraints. For example, in a transportation network, routes can be restricted to include only express buses in a network. Similar to cost calculators, each component network can have its own set of constraints.

FIG. 4 illustrates one embodiment of a table structure 400 that can be used to model an aggregated network in a database. The aggregated network includes a train network 420, a bus network 430, transfer links 440 that connect the train and bus networks, and aggregated network metadata 450. A partition table (not shown) for the aggregated network contains partition information in which the partitions of each component network are mapped to partitions for the aggregated network. Unique identifiers for aggregated network partitions are derived from the identifiers of component network partitions using a mapping function. Each component network has its own partition table that maps nodes to component network partitions.

Each component network model includes a metadata table that maps a name of the component network to the names of the component network's node and link tables. The component network metadata also lists all the aggregated networks to which the component network belongs. For example, the train network metadata identifies an aggregated network called "train and bus" to which the train network 420 belongs. The train node table includes unique identifiers for the nodes in the train network. The train link table includes the start and end nodes for each link in the train network 420 as well as a cost for the link.

A component network model may also include application specific data that corresponds to additional information about the component network that is not captured by the node and link tables of the network. Examples of application specific data include schedule and route information in a multimodal transportation network. The application specific data are associated with nodes and links in the component network. Thus, information about a particular bus stop would be associated or mapped to the node that corresponds to the bus stop.

If a particular component network model is partitioned, the application specific data is also partitioned so that the application specific data for the nodes and links associated with a partition is grouped together. To facilitate quick loading of application specific data, the application specific data for nodes and links in a given partition may be stored as a binary large object (BLOB) that is loaded when the partition is loaded into working memory. The BLOB for each partition is stored as an entry in an application specific data table. Maintaining application specific data as data blobs associated with component network partitions ensures the independence of the component networks and enables independent analysis of each component network.

The aggregated network model for the train and bus network includes, in addition to the train network model 420 and the bus network model 430, a set of transfer links 440 and aggregated network metadata 450. The train and bus transfer links table defines links between the train and bus networks. Each transfer link has a unique identifier, a start node, and an end node. The start network and end network are also included in the table. During aggregation, the start network ID and the end network ID are used to produce a unique identifier for each transfer link. It is not necessary for the nodes in various component networks to have unique node identifiers, greatly simplifying the process of integrating multiple component networks. Cost(s) can be assigned to transfer links. Note that the transfer link contains the same essential information that the component network link tables, making it possible to integrate the transfer link table with the component network link tables to form a single link table for the aggregated network.

The aggregated network metadata 450 includes a metadata table that lists each aggregated network in the network database. Each aggregated network has an entry in the aggregated network metadata table, in addition to each component network's entry in the component network metadata table. Each aggregated network entry identifies the aggregated network's node table (e.g., a view that creates a union of the component networks' node tables), the aggregated network's link table (e.g., a view that creates a union of the component networks' link tables and the aggregated network's transfer link table). During network analysis, the information in the aggregated network metadata can be used to retrieve the names of node and link tables related to the aggregated network. The schema and contents of the component network tables remain untouched during aggregated network analysis. It should be noted that the contents of the component networks are not duplicated.

The aggregated network can have cost calculators and constraints associated with it, to represent user preferences and business logic as required by the entire network. In an aggregated network that consists of a water supply network and road network, the access route along the road to reach a set of meters can be restricted to consist of only local roads and not highways. A minimum travel time route in a multimodal transportation network can be computed by setting the cost as the time spent along the routes that includes the wait time at the stops (based on bus/train schedules) and travel times along route segments.

Figure 5:
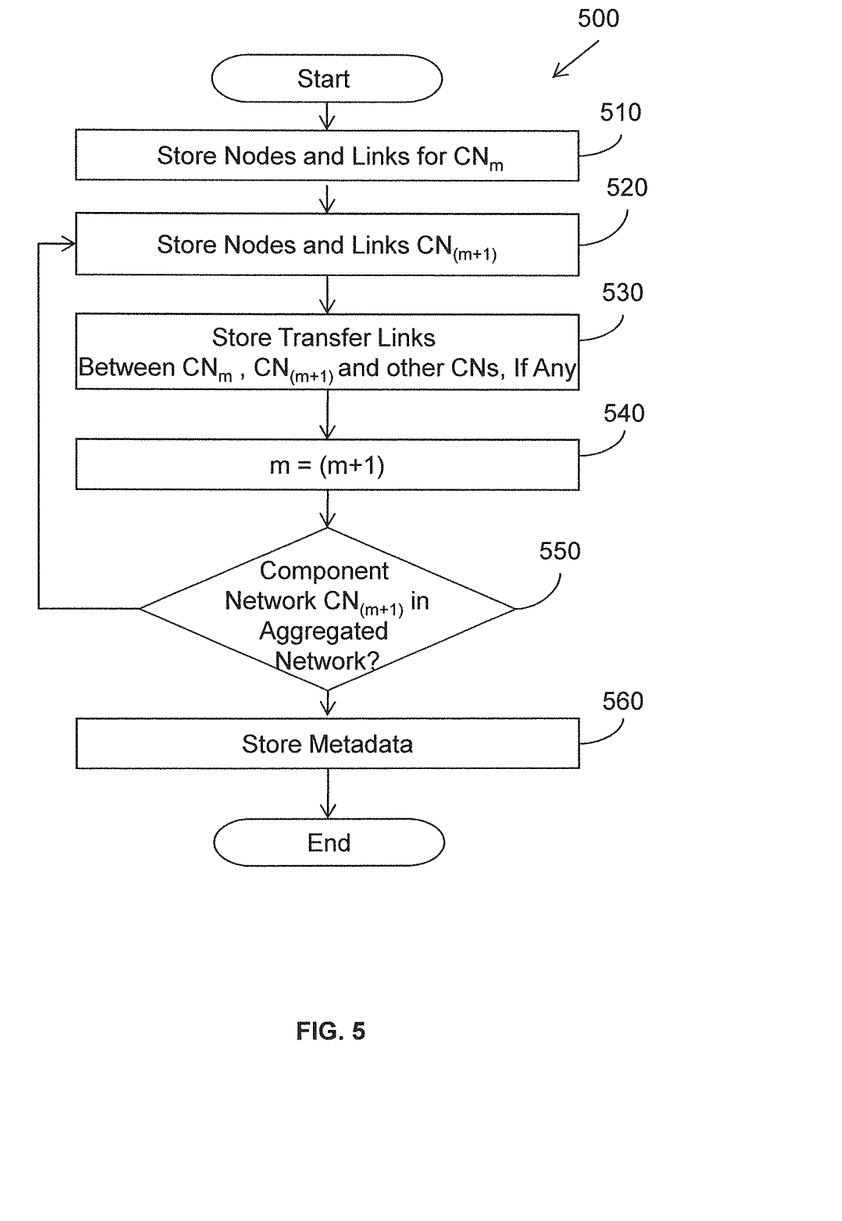
FIG. 5 illustrates an embodiment of a method of generating an aggregated network model by aggregating component networks.

FIG. 5 illustrates one embodiment of a method 500 for generating an aggregated network model. If a first network $CN_n$ has not been previously formulated, the method 500 includes, at 510, storing a first set of nodes associated with a first network $CN_n$ and a first set of links associated with the first network $CN_n$. Each link in the first set of links connects a pair of nodes in the first set of nodes. At 520 the method includes storing a second set of nodes associated with a second network $CN_{n+1}$ and a second set of links associated with the second network $CN_{n+1}$. Each link in the second set of links connects a pair of nodes in the second set of nodes. At 530 one or more sets of transfer links is stored. Each transfer link in the set of transfer links connects a node in a given component network to a node in a different component network. If there are more than two component networks, additional sets of transfer links may be stored, as appropriate. At 540 and 550, the method includes determining if the aggregated network includes any other component networks. If another component network is included in the aggregated network, the method returns to 520 where node and link information for the additional component network is stored and 530 where transfer links are stored for the additional component network. At 560, the method includes storing metadata for the aggregated network that defines the aggregated network as all the sets of nodes and all sets of links and transfer links.

In one embodiment, the method 500 includes partitioning the first set of nodes into a first partition that includes a first subset of the first set and a second partition that includes a second subset of the first set. The first subset does not intersect the second subset. The second set of nodes is partitioned into a third partition that includes a first subset of the second set and a fourth partition that includes a second subset of the second set. The first subset does not intersect the second subset. In this manner, no single partition includes both i) nodes associated with the first network and ii) nodes associated with the second network.

In one embodiment, the method 500 includes storing, in the metadata, a view for nodes that combines tables storing all the sets of nodes and a view for the links that combines tables storing all the sets of links and transfer links.

In one embodiment, the method 500 includes storing first network specific data, wherein the network specific data are associated with respective first network nodes and links. The network specific data for the first network may be stored as a binary large object (BLOB) having data that is mapped to nodes and links in the first network.

Figure 6:
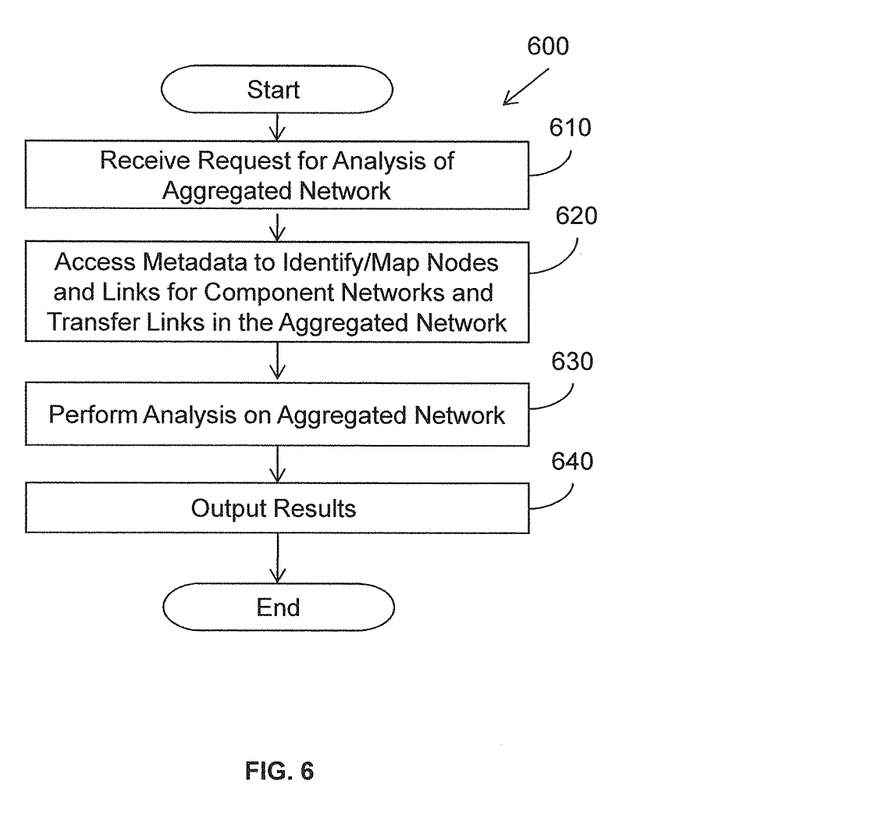
FIG. 6 illustrates an embodiment of a method of performing aggregated network analysis on an aggregated network model that aggregates component networks.

FIG. 6 illustrates one embodiment of a method 600 for performing network analysis on an aggregated network that includes a first component network and a second component network. The method 600 includes, at 610, receiving a request to perform network analysis on the aggregated network. At 620 the method includes accessing metadata to identify an aggregate set of nodes comprised of a first set of nodes associated with the first component network and a second set of nodes associated with the second component network. The nodes and links in the component networks are mapped to nodes and links in the aggregated network. The metadata is also accessed to identify an aggregate set of links comprised of a first set of links associated with the first network, the second set of links associated with the second network, and a set of transfer links associated with the aggregated network.

In one embodiment, an entry in the metadata for the aggregated network identifies a node table (e.g., a union of node tables for the first and second networks) for the aggregated network and a link table (e.g., a union of link tables for the first and second networks and the transfer link table) for the aggregated network. At 630, the method includes performing network analysis on the aggregate set of nodes and the aggregate set of links. At 640 the result to the analysis is returned.

Figure 7A:
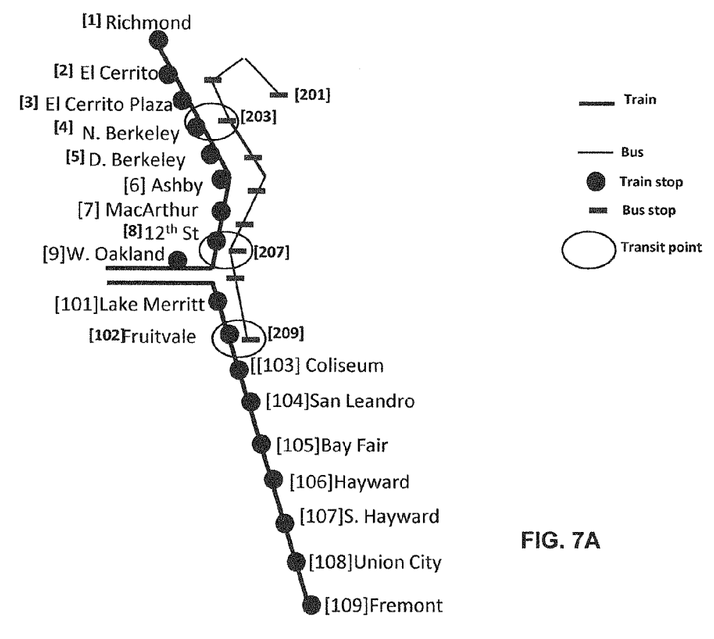
FIGS. 7A and 7B illustrate an example of an aggregated network made up of component networks and transfer links.
Figure 7B:
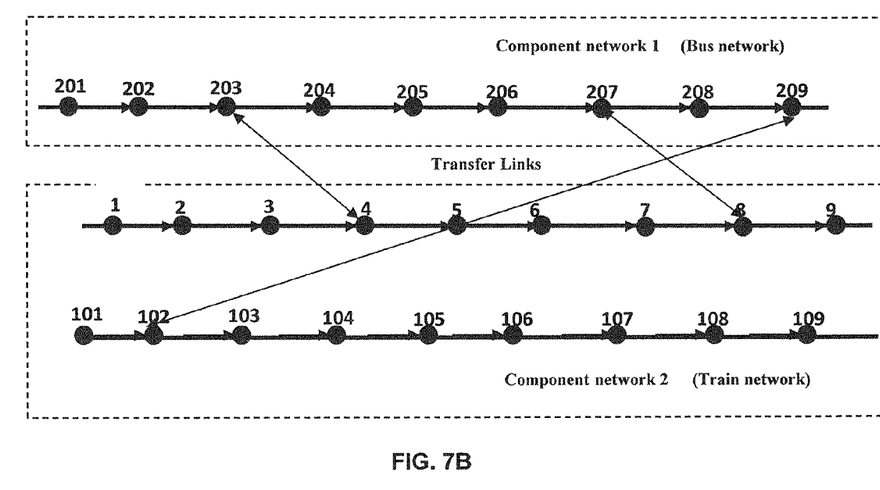

FIG. 7A illustrates a public transportation system in a metropolitan area that includes consists a bus network and two train networks. Multimodal transportation networks, more often than not, provide passengers the choice to transfer across modes or routes, thus facilitating an interconnection between the networks. To compute transit routes on such networks it is necessary to integrate the component networks into an aggregated network. This integration is accomplished through transfer links. These links connect the component networks at those points where a transit can be made from network to another. The pairs of nodes that are part of each transit are circled in FIG. 7A. For example, if a train station is within walking distance from a bus stop, a transfer link is added across these two points connecting the two component networks namely the train network and the bus network. In addition, typically there will be transfer links connecting the road network in that area to the multiple transportation networks. FIG. 7B illustrates how the transfer links can be defined that correspond to the transit points in the network.

Figure 8A:
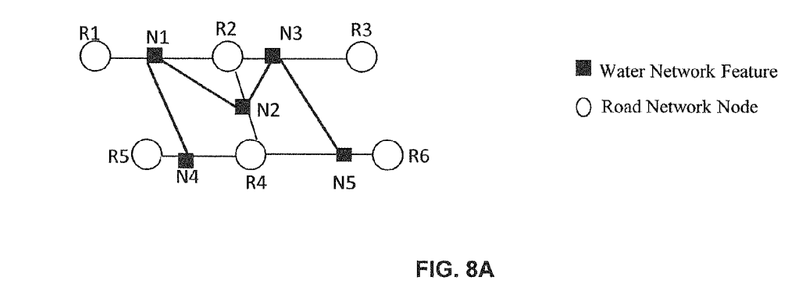
FIGS. 8A and 8B illustrate another example of an aggregated network made up of component networks and transfer links.

Utility networks are an important domain where multimodal network modeling can be used effectively. FIG. 8A illustrates an example of an aggregated network that includes a water network and a road network. To provide service access to various components of the water network, it is helpful to integrate the water network with a road network. The aggregated network can be used to determine routes for service personnel to access water network features for activities such as repairs and meter reading. While an aggregation with the road network is necessary, it is also important to maintain the water network independently so that analysis such as connectivity and fault analysis can be conducted on water network. These requirements make the described aggregated network modeling architecture suitable for modeling the scenario.

Figure 8B:
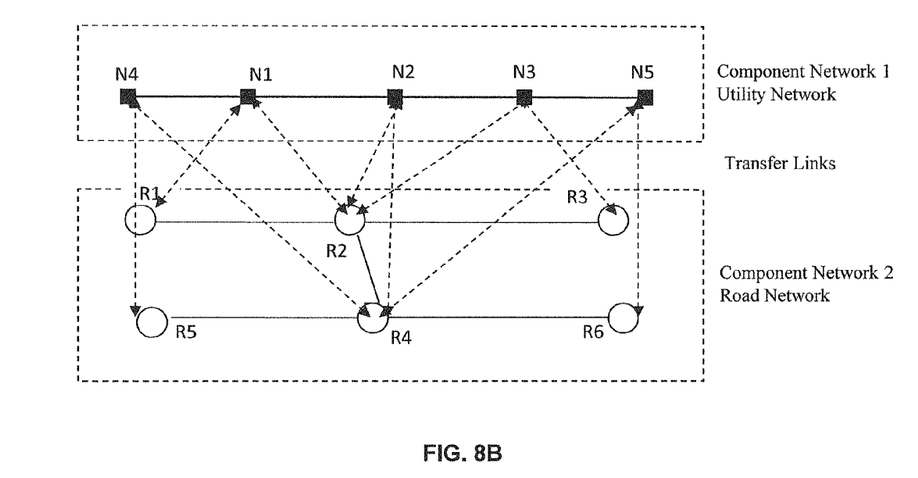

FIG. 8B illustrates how transfer links can be used to integrate the water network with the road network. Network features such as meters, valves, water reservoirs, pump stations, and customers are modeled as nodes and the connections across these are modeled as links. Transfer links provide the connections between the water network features and the road network. Other utility networks that can be modeled include electrical networks and sewage networks.

As can be seen from the foregoing description, the aggregated network modeling techniques described herein provide a generic network representation and a clean separation of logical data model from the application specific details. Modeling on component network and aggregated network levels follows the same schema and hence avoids the need to learn multiple data models. Every component network can be modeled and analyzed separately, if required.

The data model for a component network is left unaltered during the aggregation. Moreover the component network information is not duplicated. The analysis frame work is the same for the aggregated network and component networks. APIs are the same and this makes development effort easier. Adding and removing component networks is straightforward and overhead is small. Component network schemas are not changed, avoiding the need to regenerate data for the whole aggregated network.

Since data specific to each component network is maintained separately at all points, maintaining the independence of these networks making it possible to perform analysis on these networks individually. The model does not require reformulation of component network data thus avoiding duplication, making the model storage efficient. User preferences and required business logic can be handled at the component level and aggregate level. Though the model is generic and is application-independent, it can be easily customized to handle application specific details through mechanisms such as constraints, cost calculators, and user data. The data model is RDBMS-based. It is persistent, open (non-proprietary) and standard (SQL) compared to proprietary models that are very often unpublished. The proprietary tools often require special tools to create and subsequently to modify the model. Users can easily modify the data in the model.

Computer Embodiment

Figure 9:
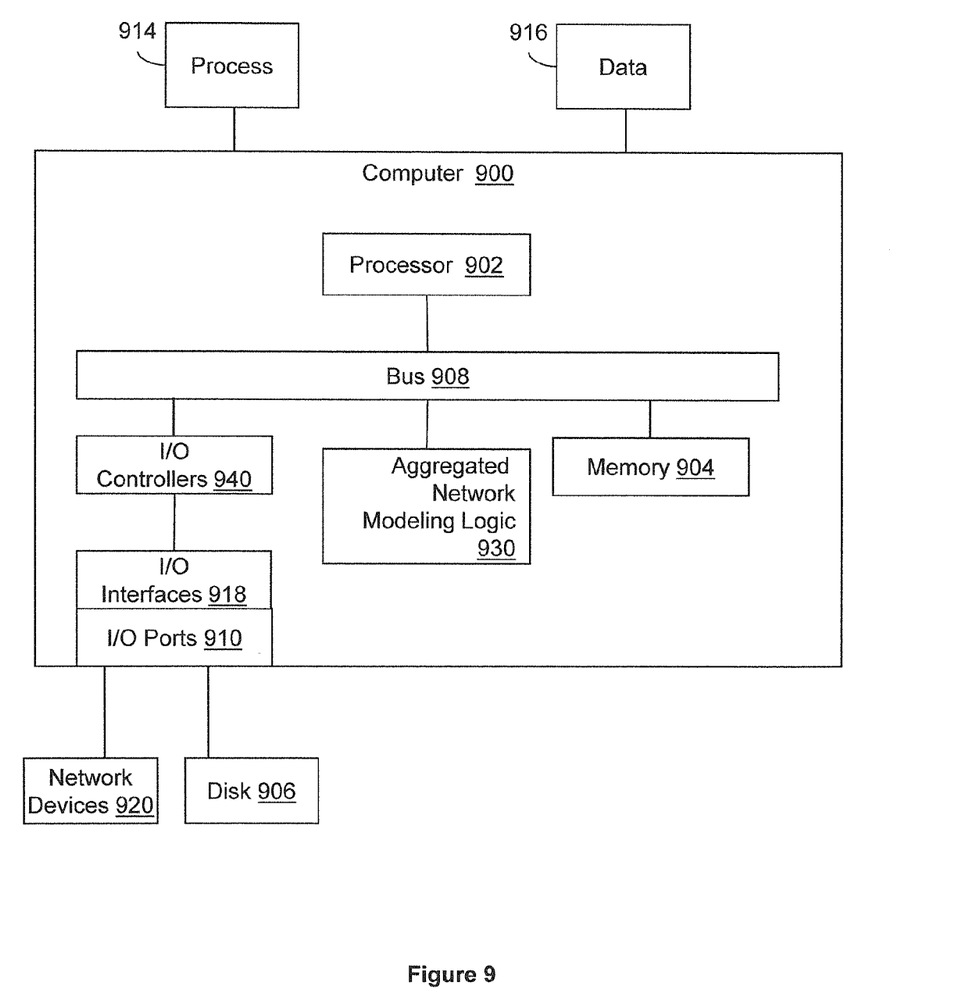
FIG. 9 illustrates an embodiment of a computing system configured with the example systems and/or methods disclosed.

FIG. 9 illustrates an example computing device that is configured and/or programmed with one or more of the example systems and methods described herein, and/or equivalents. The example computing device may be a computer 900 that includes a processor 902, a memory 904, and input/output ports 910 operably connected by a bus 908. In one example, the computer 900 may include aggregated network modeling logic 930 configured to facilitate aggregated network modeling. The aggregated network modeling logic 930 may include the model loading logic and/or the analysis logic FIGS. 1 and 3. In different examples, the aggregated network modeling logic 930 may be implemented in hardware, a non-transitory computer-readable medium with stored instructions, firmware, and/or combinations thereof. While the aggregated network modeling logic 930 is illustrated as a hardware component attached to the bus 908, it is to be appreciated that in one example, the aggregated network modeling logic 930 could be implemented in the processor 902.

In one embodiment, the aggregated network modeling logic 930 or the computer is a means (e.g., hardware, non-transitory computer-readable medium, firmware) for aggregated network modeling. The means may be implemented, for example, as an ASIC programmed to generate and store An aggregated network model that aggregates component models. The means may also be implemented as stored computer executable instructions that are presented to computer 900 as data 916 that are temporarily stored in memory 904 and then executed by processor 902.

The aggregated network modeling logic 930 may also provide means (e.g., hardware, non-transitory computer-readable medium that stores executable instructions, firmware) for generating and storing and/or analyzing an aggregated network model that aggregates component models.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the methods described with reference to FIGS. 5 and 6.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing instructions that, when executed by one or more processors of a computing device, cause the computing device to at least:

analyze, via the one or more processors, a first component network, stored in a first data structure, to identify a first set of nodes and a first set of links, wherein each link in the first set of links connects a pair of nodes in the first set of nodes, wherein the first set of nodes is stored within a first node table and the first set of links is stored within a first link table;

analyze, via the one or more processors, a second component network, stored in a second data structure, to identify a second set of nodes and a second set of links, wherein each link in the second set of links connects a pair of nodes in the second set of nodes, wherein the second set of nodes is stored within a second node table and the second set of links is stored within a second link table;

wherein the first component network represents a first type of network and the second component network represents a second type of network that is independent from the first type of network by having no links that connect the first set of nodes and the second set of nodes;

define, via the one or more processors based at least on the analysis, a set of transfer links that connect the first component network to the second component network at one or more nodes, wherein the set of transfer links are stored within a transfer link table;

generate, via the one or more processors, an aggregated network model that includes the first component network and the second component network by:

generating, via the one or more processors, metadata defining the aggregated network model by referencing the first node table, the second node table, the first link table, the second link table, and the transfer link table; and generate, via the one or more processors in response to a request, a relationship between nodes of the first component network and nodes of the second component network using the metadata by:

creating a node view of nodes of the aggregated network model by combining the first node table and the second node table using a union operation;

creating a link view of links of the aggregated network model by combining the first link table, the second link table, and the transfer table using the union operation; and generating the relationship based on an analysis of a combination of the node view and the link view of the aggregated network model.

2. The non-transitory computer-readable medium of claim 1, wherein the instructions further comprise instructions that, when executed by the one or more processors, cause the computing device to:

partition, via the one or more processors, the first set of nodes into (i) a first partition that includes a first subset of the first set of nodes, and (ii) a second partition that includes a second subset of the first set of nodes, wherein the first subset does not intersect the second subset; and partition, via the one or more processors, the second set of nodes into (i) a third partition that includes a first subset of the second set of nodes, and (ii) a fourth partition that includes a second subset of the second set of nodes, wherein the first subset does not intersect the second subset, wherein the partitions are defined such that no single partition includes both i) nodes associated with the first component network and ii) nodes associated with the second component network.

3. The non-transitory computer-readable medium of claim 1, wherein the first component network corresponds to a first type of utility network and the second component network corresponds to a second type of utility network, wherein the instructions further comprise instructions that, when executed by the one or more processors, cause the computing device to:

evaluate the combination of the node view and the link view of the aggregated network model to identify a first relationship between a first utility object of the first type of utility network and a second utility object of the second type of utility network.

4. The non-transitory computer-readable medium of claim 1, wherein the first component network corresponds to a utility network of a utility and the second component network corresponds to customer network of customers of the utility, wherein the instructions further comprise instructions that, when executed by the one or more processors, cause the computing device to:

evaluate the combination of the node view and the link view of the aggregated network model to identify a first relationship between a utility object of the utility network and a customer of the customer network.

5. The non-transitory computer-readable medium of claim 4, wherein the first component network corresponds to a location network of locations and the second component network corresponds to a person network of people, wherein the instructions further comprise instructions that, when executed by the one or more processors, cause the computing device to:
evaluate the combination of the node view and the link view of the aggregated network model to identify a first relationship between a location of the location network and a person of the person network.

6. The non-transitory computer-readable medium of claim 1, wherein the instructions further comprise instructions that, when executed by the one or more processors, cause the computing device to:
receive a request, via the one or more processors, to perform network analysis on the aggregated network model;
access the metadata, via the one or more processors, to identify:
an aggregate set of nodes comprised of the first set of nodes and the second set of nodes;
an aggregate set of links comprised of the first set of links, the second set of links, and the set of transfer links; and
perform network analysis, via the one or more processors, on the aggregate set of nodes and the aggregate set of links as if the aggregated network model is a component network.

7. The non-transitory computer-readable medium of claim 1, wherein the instructions further comprise instructions that, when executed by the one or more processors, cause the computing device to:
store metadata for the first component network, via the one or more processors, that defines the first component network as the first set of nodes and the first set of links; and
store metadata for the second component network, via the one or more processors, that defines the second component network as the second set of nodes and the second set of links.

8. A computing system, comprising:
a processor;
a memory connected to at least the processor;
a model loading module stored in a non-transitory computer-readable medium including instructions that when executed cause the processor to:
store, in the memory as a first node table, a first set of nodes associated with a first component network and store within a first link table a first set of links associated with the first component network, wherein each link in the first set of links connects a pair of nodes in the first set of nodes;
store, in the memory as a second node table, a second set of nodes associated with a second component network and store within a second link table a second set of links associated with the second component network, wherein each link in the second set of links connects a pair of nodes in the second set of nodes;
wherein the first component network represents a first type of network and the second component network represents a second type of network that is independent from the first type of network by having no links that connect the first set of nodes and the second set of nodes;
define, by the one or more processors within a link transfer table, a set of transfer links that connect the first component network to the second component network at one or more nodes;
generate an aggregated network model that includes the first component network and the second component network by:
generating, by the processor, metadata defining the aggregated network model by referencing the first node table, the second node table, the first link table, the second link table, and the transfer link table; and
generate, by the one or more processors in response to a request, a relationship between nodes of the first component network and nodes of the second component network using the metadata by:
creating a node view of nodes of the aggregated network model by combining the first node table and the second node table using a union operation;
creating a link view of links of the aggregated network model by combining the first link table, the second link table, and the transfer table using the union operation; and
generating the relationship based on a combination of the node view and the link view of the aggregated network model.

9. The computing system of claim 8 wherein the model loading module further includes instructions that when executed cause the processor to:
partition the first set of nodes into a first partition that includes a first subset of the first set and a second partition that includes a second subset of the first set, wherein the first subset does not intersect the second subset; and
partition the second set of nodes into a third partition that includes a first subset of the second set and a fourth partition that includes a second subset of the second set, wherein the first subset does not intersect the second subset;
wherein the partitions are defined such that no single partition includes both i) nodes associated with the first component network and ii) nodes associated with the second component network.

10. The computing system of claim 8 wherein the model loading module further includes instructions that when executed cause the processor to:
store, in the metadata, a first row of a table that combines the first node table storing the first set of nodes and the second node table storing the second set of nodes; and
store, in the metadata, a second row of the table that combines the first link table storing the first set of links, the second link table storing the second set of links, and the transfer link table storing the set of transfer links.

11. The computing system of claim 8 wherein the model loading module further includes instructions that when executed cause the processor to store first network specific data, wherein the first network specific data is associated with respective first network nodes and links.

12. The computing system of claim 8 wherein the model loading module further includes instructions that when executed cause the processor to generate, by the processor in response to a request, a computed route across the first component network and the component network based at least in part on the aggregated network model, wherein the computed route minimizes a number of transfers based on the set of transfer links.

13. The computing system of claim 8 further comprising:
an analysis module stored in the non-transitory computer-readable medium including instructions that when executed cause the processor to:
receive a request to perform network analysis on the aggregated network model;
access the metadata to identify:
an aggregate set of nodes comprised of the first set of nodes and the second set of nodes, and
an aggregate set of links comprised of the first set of links, the second set of links, and the set of transfer links associated with the aggregated network model; and
perform network analysis on the aggregate set of nodes and the aggregate set of links as if the aggregated network model is a component network.

14. A computer-implemented method performed by a computing device where the computing device includes at least a processor for executing instructions from a memory, the method comprising:
analyzing, via the processor, a first component network to identify a first set of nodes and a first set of links, wherein each link in the first set of links connects a pair of nodes in the first set of nodes, wherein the first set of nodes is stored within a first node table and the first set of links is stored within a first link table;
analyzing, via the processor, a second component network to identify a second set of nodes and a second set of links, wherein each link in the second set of links connects a pair of nodes in the second set of nodes, wherein the second set of nodes is stored within a second node table and the second set of links is stored within a second link table;
wherein the first component network represents a first type of network and the second component network represents a second type of network that is independent from the first type of network by having no links that connect the first set of nodes and the second set of nodes;
defining, by the processor based at least on the analysis, a set of transfer links that connect the first component network to the second component network at one or more nodes, wherein the set of transfer links are stored within a transfer link table;
generating, via the processor, an aggregated network model that includes the first component network and the second component network by:
generating, via the processor, metadata defining the aggregated network model by referencing the first node table, the second node table, the first link table, the second link table, and the transfer link table; and
generating, by via the processor in response to a request, a relationship between nodes of the first component network and nodes of the second component network using the metadata by:
creating a node view of nodes of the aggregated network model by combining the first node table and the second node table using a union operation;
creating a link view of links of the aggregated network model by combining the first link table, the second link table, and the transfer table using the union operation; and
generating the relationship based on a combination of the node view and the link view of the aggregated network model.

15. The computer-implemented method of claim 14, comprising:
storing metadata for the first component network, via the processor, that defines the first component network as the first set of nodes and the first set of links; and
storing metadata for the second component network, via the processor, that defines the second component network as the second set of nodes and the second set of links.

16. The computer-implemented method of claim 14, comprising:
partitioning, via the processor, the first set of nodes into a first partition that includes a first subset of the first set and a second partition that includes a second subset of the first set, wherein the first subset does not intersect the second subset; and
partitioning, via the processor, the second set of nodes into a third partition that includes a first subset of the second set and a fourth partition that includes a second subset of the second set, wherein the first subset does not intersect the second subset;
wherein the partitions are defined such that no single partition includes both i) nodes associated with the first component network and ii) nodes associated with the second component network.

17. The computer-implemented method of claim 14, comprising:
storing, in the metadata via the processor, a first row in a data table that represents an integrated view of the first node table storing the first set of nodes and the second node table storing the second set of nodes; and
storing, in the metadata via the processor, a second row in the data table that represents an integrated view of the first link table storing the first set of links, the second link table storing the second set of links, and the transfer link table storing the set of transfer links.

18. The computer-implemented method of claim 14, comprising storing, via the processor, first network specific data, wherein the first network specific data is associated with respective first network nodes.

19. The computer-implemented method of claim 18, comprising storing, via the processor, the first network specific data as a binary large object (BLOB) having data that is mapped to nodes and links in the first component network.

20. The computer-implemented method of claim 14, comprising:
receiving, via the processor, a request to perform network analysis on the aggregated network;
accessing, via the processor, the metadata to identify:
an aggregate set of nodes comprised of the first set of nodes and the second set of nodes;
an aggregate set of links comprised of the first set of links, the second set of links, and the set of transfer links associated with the aggregated network; and
performing, via the processor, network analysis on the aggregate set of nodes and the aggregate set of links.

* * * * *

UNITED STATES PATENT AND TRADEMARK OFFICE
CERTIFICATE OF CORRECTION

PATENT NO. : 10,122,583 B2
APPLICATION NO. : 14/325695
DATED : November 6, 2018
INVENTOR(S) : George et al.

Page 1 of 1

It is certified that error appears in the above-identified patent and that said Letters Patent is hereby corrected as shown below:

In the Specification

In Column 3, Line 51, delete "network l" and insert -- network i --, therefor.

In Column 9, Line 23, delete "An" and insert -- an --, therefor.

Signed and Sealed this
Fifth Day of November, 2019

Andrei Iancu
*Director of the United States Patent and Trademark Office*